(12) United States Patent
Welton et al.

(10) Patent No.: US 6,168,767 B1
(45) Date of Patent: Jan. 2, 2001

(54) PRODUCTION OF ALUMINA

(75) Inventors: Roger Welton, Beverley; Philip McColl, Huddersfield, both of (GB)

(73) Assignee: Ciba Specialty Chemicals Water Treatments Limited, Bradford (GB)

( * ) Notice: Under 35 U.S.C. 154(b), the term of this patent shall be extended for 0 days.

(21) Appl. No.: 09/229,544

(22) Filed: Jan. 13, 1999

(30) Foreign Application Priority Data

Jan. 15, 1998 (GB) .................................................. 9800855

(51) Int. Cl.$^7$ ....................................................... C01F 7/02
(52) U.S. Cl. ........................... 423/122; 423/121; 423/127
(58) Field of Search .................................... 423/122, 121, 423/127

(56) References Cited

U.S. PATENT DOCUMENTS

| | | | |
|---|---|---|---|
| 4,737,352 | 4/1988 | Owen et al. | 423/122 |
| 5,100,641 | 3/1992 | Schmidt et al. | 423/624 |
| 5,167,831 | 12/1992 | Dimas | 210/728 |
| 5,346,511 | 9/1994 | Dimas | 23/293 |

FOREIGN PATENT DOCUMENTS

| | | |
|---|---|---|
| 0631985 | 1/1995 | (EP) . |
| 92/10426 | 6/1992 | (WO) . |

OTHER PUBLICATIONS

Chem. Abstr. 108:135508r for HU 43011 (1987).
Chem. Abstr. 108:135508 for HU 203852 (1987).
Chem. Abstr. 92:131525 for JP 54158398 (1979).

*Primary Examiner*—Steven P. Griffin
*Assistant Examiner*—Christina Ildebrando
(74) *Attorney, Agent, or Firm*—David R. Crichton

(57) ABSTRACT

A process of recovering alumina from a pregnant Bayer process liquor by crystallisation after adding to the liquor a crystallisation modifier characterised in that the crystallisation modifier comprises:

(a) a polyalkoxylated non-ionic surfactant,
(b) a surfactant, or precursor thereof, which is not a polyalkoxylated non-ionic surfactant and
(c) water.

In a further aspect of the invention the composition may contain water but preferably contains substantially no water. Preferred compositions for the crystallisation modifier for use in this process contain a surfactant blend which consists essentially only of the polyalkoxylated non-ionic surfactant (a) and the surfactant (b) or precursor thereof. The process consistently gives excellent improvement in crystal size without decreased yield. Specifically the process results in a reduction in the percentage of undersized crystals.

14 Claims, No Drawings

PRODUCTION OF ALUMINA

This invention relates to the recovery of alumina from pregnant Bayer process liquors by crystallisation.

In the Bayer process, bauxite is digested with aqueous caustic to form a caustic liquor containing sodium aluminate and red mud, the red mud is separated by settling and filtration to produce the pregnant liquor, alumina trihydrate is crystallised from the pregnant liquor, and the supernatant liquor is recycled.

It is known that the yield and properties of the crystals can be significantly affected by deliberate process conditions such as the temperature profile in the process and the amount and nature of crystal seed that is added to the process, and by impurities, especially organic salts such as sodium oxalate and sodium humate.

Although it is naturally desirable to obtain a high yield of crystals, it is undesirable if the yield is provided mainly by very fine (below 45 $\mu$m) crystals. However the presence of some fine crystals can be desirable for seeding purposes.

Optimum performance requires optimisation of the yield and the average particle size, and the latter may be affected also by the strength of the crystals, i.e., the resistance to attrition. Merely increasing the yield while obtaining reduced crystal size is unsatisfactory, as is obtaining increased crystal size but reduced yield.

It is well known to add a crystallisation modifier to the pregnant liquor in order to impose a deliberate modification on the crystallisation characteristics. The modification that is imposed usually involves a reduction in the proportion of fines, i.e., an increase in the average particle size.

JP-A-54/158398 describes classification of aluminium hydroxide particle suspensions with anionic surfactants such as sodium alkyl benzene sulphonate, sodium alkyl naphthalene sulphonate and sodium dinaphthylmethane sulphonate. These surfactants are generally not good for controlling foam and are limited by their molecular weight and consequent adsorption capability.

Other systems have also been described which incorporate mineral or silicone oils. For instance, in Chemical Abstracts 108:135508 and Hungarian Patent No. 203,852B, a complex mixture of surfactants, silicone oil and hydrocarbon oil is described for crystallisation of alumina trihydrate from pregnant Bayer process liquor. The exemplified mixture in the patent (but not the Chemical Abstracts reference) includes a nonyl phenyl polyglycol ether ester surfactant, the hydrocarbon decahydronaphthalene and the silicone oil dimethyl siloxane. The exemplified mixture contains approximately 39 wt % mineral oil and silicone oil and the minimum total amount of these materials indicated in the patent is 25 wt %. U.S. Pat. No. 4,737,352 also describes a mixture of oil and anionic surfactant for the same purpose. The anionic surfactant is a tall oil fatty acid and the oil can be paraffinic oil, naphthenic oil, mineral seal oil, fuel oil or residue from a $C_{10}$ alcohol distillation. EP-A-631,985 also describes use of a blend of oils as a crystallisation modifier during the separation of alumina trihydrate from pregnant Bayer process liquor. In this publication, the crystallisation modifier is a combination of a silicone oil and a mineral oil.

Crystallisation modifier systems which contain oils of these types (silicone oils and mineral oils) have the disadvantage that if the oils contain any impurities they tend to cause discoloration of the trihydrate crystals. Avoiding this necessitates expense in using only very pure oils. Even pure oils increase the total organics load in the Bayer process circuit, which is preferred to be avoided. Those working in the Bayer process would prefer to see lower organics load in order to reduce the possibility of impurities directly added or impurities generated in the highly caustic environment which could have an adverse effect on process kinetics/cycles etc as a result of organics building up and acting as poisons.

It would be desirable to be able to provide a crystallisation modifier system which does not cause discoloration of the crystals but which in use gives good crystal size and yield.

According to a first aspect of the invention we provide a process of recovering alumina from pregnant Bayer process liquor by crystallisation after adding to the liquor a crystallisation modifier, characterised in that the crystallisation modifier comprises:
 (a) a polyalkoxylated non-ionic surfactant,
 (b) a surfactant, or a precursor thereof, which is not a polyalkoxylated non-ionic surfactant, and
 (c) water.

This combination of materials has various advantages. In particular, it gives excellent improvement in crystal size without decreased yield results in use. Furthermore, it has been found that the crystallisation modifier can be formulated with substantially no mineral oil or silicone oil and is formulated as an aqueous composition. Thus the disadvantages discussed above of including these can be avoided.

Additionally, the composition contains water which allows the production of a stable, homogeneous composition containing the two surfactants (a) and (b). Inclusion of water further dilutes the active surfactant materials and provides easier dosing.

One essential component of the crystallisation modifier is a polyalkoxylated non-ionic surfactant. Generally it is formed from units comprising ethylene oxide (EO) units. Preferably it contains ethylene oxide and propylene oxide (PO) units, and is for instance an ethylene oxide-propylene oxide block copolymer. Suitable non-ionic surfactants of this type are available under the trade names Pluronic, Synperonic PE, Dowfax and Monolan. In preferred ethylene oxide-propylene oxide block copolymers the content of ethylene oxide units generally ranges from 10 to 60%, preferably 10 to 40%, (by weight) and the content of propylene oxide units generally ranges from 40 to 90%, preferably 60 to 90% (by weight).

Other preferred polyalkoxylated non-ionic surfactants are formed from units selected from ethylene oxide, propylene oxide, butylene oxide (BO) and functional moieties such as alcohols and amines. Preferred surfactants of this type contain blocks of ethylene oxide units and blocks of propylene oxide units.

Suitable functional alcohols include mono-, di-, tri- and tetrols, and phenols and sorbitols. Suitable examples of surfactants which include a functional alcohol unit are the Plurafac LF series of surfactants which are formed from synthetic fatty alcohol (mono-ol) plus EO/PO chain. Suitable diol functional groups are ethylene and propylene glycol. Suitable triols are based on glycerol and trimethylol propane. Some of the Ukanil and Dowfax range of surfactants are based on triols of these types. Suitable tetra-ols are based on pentaerythritol.

Other functional moieties include amines, such as ethylene diamine. Suitable examples of surfactants which include a functional amine unit are the Tetronics, based on ethylene diamine.

In non-ionic surfactants which include ethylene oxide, propylene oxide and butylene oxide monomer units, the amount of butylene oxide units is often up to 40% (by weight), for instance at least 1% (by weight).

Preferred polyalkoxylated non-ionic surfactants have molecular weight of the EO/PO (and optionally BO) chain of 600 Daltons or greater, preferably 2,000 to 5,000 Daltons.

It is preferred that the polyalkoxylated non-ionic surfactant (a) has a cloud point tested in 1% solution in water of from 10 to 100° C., preferably 20 to 60° C. If the polyalkoxylated surfactant is a mixture, the cloud point is that measured for the mixture.

The polyalkoxylated non-ionic surfactant (a) is preferably water-soluble. That is, it has a solubility at 25° C. of at least 10 g/100 ml deionised water, preferably at least 20 g/100 ml deionised water.

The crystallisation modifier also comprises (b) a surfactant of a type different from type (a) or a precursor thereof. By a precursor of such a surfactant we mean a material which forms such a surfactant material on addition to the caustic pregnant liquor.

The surfactant (b) is chosen such that it is capable of dispersing the polyalkoxylated non-ionic surfactant in water, and maintaining a stable composition. In particular, it is capable of maintaining a stable composition in which the components do not separate for at least 6, preferably 12 months.

Examples of suitable surfactants (b) include anionic surfactants such as alkylaryl polyether sulphate, alcohol ethoxylate sulphates, alcohol sulphonates, alkylaryl sulphonates and paraffin or olefin based alkyl sulphonates. Preferred surfactants (b) are fatty acids, which may have a saturated or unsaturated fatty chain of length $C_4$ to $C_{22}$. Preferably the fatty chain is $C_{18}$ unsaturated. Suitable fatty acids may contain one or more carboxylic acid, ester, anhydride or sulphate functional groups attached directly or by a succinic alkyl linkage. Preferred fatty acid chain lengths are from $C_8$ to $C_{22}$, more preferably $C_{12}$ to $C_{20}$. Preferred fatty acids are liquid. A particularly suitable surfactant (b) is oleic acid. Other examples are vegetable fatty acids, fish fatty acids, coconut fatty acids, lauric acid, linoleic acid and linolenic acid, and mixtures of oleic, linoleic and linolenic acids are often suitable. Another suitable mixture is available in the form of oleine, which is a mixture containing mainly $C_{18}$ unsaturated fatty acids. Preferred mixtures contain at least 60% (by weight of the mixture) of $C_{18}$ unsaturated fatty acids.

In this specification when we discuss fatty acid we include the fatty acid soap form. In fact, the soap form is the usual form in which fatty acids will be present in the pregnant liquor, due to its highly caustic nature.

The surfactant (b) is preferably water-soluble, water-solubility being defined as for surfactant (a) above.

Some of the preferred fatty acid surfactants (b) are water-soluble in the acid form. Preferably the surfactant (b) is a fatty acid soap. These are generally water-soluble.

Suitable fatty acid precursors include triglycerides which are hydrolysed to form the fatty acid soap and glycerol on addition to the pregnant liquor. They may be converted to the fatty acid prior to addition to the pregnant liquor by the inclusion of alkaline materials in the crystallisation modifier composition.

When the surfactant (b) is a water-soluble fatty acid soap, suitable fatty acid precursors include water-insoluble fatty acid materials in the acid rather than the soap form, which are rendered water-soluble by conversion to the soap in the caustic pregnant liquor.

The composition may include mixtures of surfactants (b) and mixtures of surfactants (b) with surfactant precursors, as well as mixtures of precursors.

The crystallisation modifier has a composition which contains water, generally in an amount of from 30 to 97 wt %, preferably 50 to 90 wt % and more preferably 60 to 80 wt %.

The polyalkoxylated non-ionic surfactant (a) is generally present in amounts of from 1 to 30 wt %, preferably 5 to 20 wt %, often 7 to 15 wt %.

The surfactant (b) or precursor thereof is generally present in amounts of from 2 to 40 wt %, preferably 5 to 30 wt %, often 10 to 20 wt %.

The composition also preferably contains a base such as sodium hydroxide so as to give it a pH of at least 8.0, preferably at least 9.0. When the composition includes a fatty acid this is believed to induce at least partial neutralisation of the fatty acid. Full neutralisation can be obtained but is not necessary. We find that the inclusion of a base improves solubility of the polyalkoxylated non-ionic surfactant (a). We also find that compositions containing a base have excellent shelf life and are generally stable for at least 12 months.

The composition may contain a co-solvent (c), to aid in dissolving the polyalkoxylated non-ionic surfactant (a). Co-solvent (c) may be included in the composition instead of alkaline materials but inclusion of alkaline materials instead of co-solvent (c) is preferred. Suitable co-solvents include $C_6$ to $C_{20}$ alcohols, for instance 2-ethylhexanol.

Preferably the composition contains either alkaline material or co-solvent (c), but preferably not both.

A particular advantage of the crystallisation modifiers of the present invention is that they do not require the presence of oils. Preferably therefore the crystallisation modifier contains less than 10 wt %, more preferably less than 5 wt % and most preferably is substantially free of, mineral oils, in particular hydrocarbon oils. Preferably it contains less than 10 wt %, more preferably less than 5 wt % and most preferably is substantially free of, silicone oils, for instance siloxanes such as polydimethyl siloxanes. Particularly preferably the composition is free of both mineral oils and silicone oils.

In the process of the invention the components of the crystallisation modifier can be added to the pregnant liquor separately, in any order. Preferably however they are added together. Generally the crystallisation modifier is supplied as a blend of all the components and the required amount of this blend is dosed into the pregnant liquor.

The first aspect of the invention also includes a crystallisation modifier composition which comprises (a) a polyalkoxylated non-ionic surfactant, (b) a surfactant or precursor thereof which is not a polyalkoxylated non-ionic surfactant, and (c) water. Any of the additional features of the crystallisation modifier discussed above in connection with the process of the first aspect of the invention may be applied to the composition of the first aspect of the invention.

The crystallisation modifier compositions are generally made by mixing the requisite components.

For compositions which include alkaline material such as sodium hydroxide, the polyalkoxylated non-ionic surfactant (a) and water are usually mixed first. The alkaline material is then added to the mixture (preferably with stirring). The surfactant (b) is then added and agitation is carried out until a homogeneous mixture is obtained.

In one method of providing compositions without alkaline material, the surfactant (b) is preferably mixed first with the water. The polyalkoxylated non-ionic surfactant (a) is then added to the mixture. If a co-solvent (c) is to be used this is then added to the mixture and the composition mixed until a homogeneous composition is obtained. In another method of providing compositions without alkaline material the polyalkoxylated non-ionic surfactant is mixed with water. If co-solvent (c) is to be used this is then added to the mixture after which the surfactant (b) is then added and the composition mixed to obtain a homogeneous composition.

In a second aspect the invention also provides a process of recovering alumina from a pregnant Bayer process liquor by crystallisation after adding to the liquor a crystallisation modifier characterised in that the crystallisation modifier comprises:

(a) a polyalkoxylated non-ionic surfactant and
(b) a surfactant, or precursor thereof, which is not a polyalkoxylated non-ionic surfactant
and the crystallisation modifier contains not more than 15% by weight of the crystallisation modifier composition of silicone oil and mineral oil.

Thus in this aspect of the invention it is not essential that the crystallisation modifier composition contains water, but it is essential that the total amount of silicone oil and mineral oil is reduced. This alleviates the disadvantages of potential discoloration of trihydrate crystals (if impure oils are used) and the expense of ensuring that only pure oils are used, and of increasing the organics load in the Bayer process circuit.

In this aspect of the invention it is essential that the total amount of mineral oil plus silicone oil does not exceed 15% by weight of the crystallisation modifier composition. Preferably the total amount of mineral oil and silicone oil is not more than 10%, more preferably not more than 5 wt %, most preferably not more than 1 or 2 wt. % or even not more than 0.5 wt. %. Preferably the amount of each type of oil is not more than 5 wt %, more preferably not more than 1 or 2 wt. %, especially not more than 0.5 wt. %. In especially preferred processes the crystallisation modifier contains substantially no mineral oil and silicone oil. Low levels of these oils also provide increased convenience of formulation.

The crystallisation modifier used in the second aspect of the invention preferably comprises polyalkoxylated non-ionic surfactant (a) in an amount. of from 20 to 60 wt %, preferably 30 to 50 wt %. It comprises surfactant (b) or precursor thereof preferably in amounts of 40 to 80 wt %, more preferably 50 to 70 wt %.

In the process of the second aspect of the invention the composition may contain water but preferably contains substantially no water. Preferred compositions for the crystallisation modifier for use in this process contain a surfactant blend which consists essentially only of the polyalkoxylated non-ionic surfactant (a) and the surfactant (b) or precursor thereof. More preferably the crystallisation modifier composition consists essentially of a mixture of the non-ionic surfactant (a) and the surfactant (b) or precursor thereof.

The second aspect of the invention also includes a crystallisation modifier composition which comprises (a) a polyalkoxylated non-ionic surfactant and (b) a surfactant or precursor thereof which is not a polyalkoxylated non-ionic surfactant and the crystallisation modifier composition contains not more than 15 wt % silicone oil and mineral oil.

Any of the additional features of the crystallisation modifier discussed above in connection with the process of the second aspect of the invention may be applied to the composition of the second aspect of the invention.

In the second aspect of the invention any of the features of the first aspect of the invention may be used. The addition of the crystallisation modifier is generally made after the final filtration stage through which the pregnant liquor passes prior to the crystallisation, i.e., generally after the Kelly filters through which the pregnant liquor often passes between the primary settler and the crystallisation stage. Usually the crystallisation modifier is added as close as practicable to the crystallisation stage. The addition should be made accompanied by sufficient agitation to distribute the modifier through the liquor prior to crystallisation.

The amount of modifier that is required for optimum performance can be found by routine experimentation but is generally in the range 5 to 300 mg/l, preferably 10 to 100 mg/l with optimum cost-effectiveness generally being achieved with a dosage of 5 to 50, preferably 10 to 30, mg/l.

Crystallisation is conducted in otherwise conventional manner by cooling, seeding and agitating pregnant liquor. Multiple tanks may be used to provide the long residence time required (up to 50 hours). The tanks can be arranged batchwise or continuously. If batchwise each tank is charged with pregnant liquor and seed and then discharged in sequence. If continuous, pregnant liquor and seed are charged into the first tank continuously and flow through each tank in turn. Plant conditions may vary considerably. Seed addition is usually in the order of 40 to 300 g/l.

It is believed that crystal growth can involve two different mechanisms and that in commercial operation both may occur simultaneously.

Crystal growth involves precipitating alumina onto a growing crystal to enlarge that crystal. It can be simulated in the laboratory by the use of a high seed ratio and cooling.

Agglomeration involves two or more growing crystals agglomerating to produce a larger, single growing crystal around which alumina precipitates. It can be simulated in the laboratory by the use of a lower seed ratio and substantially constant temperature. In the experiments below we simulate agglomeration. Simulated agglomeration tests tend to demonstrate more clearly than crystal growth simulation differences between different crystallisation modifier formulations.

The invention will now be illustrated with reference to the following examples.

EXAMPLES

In these examples four products were used, as follows:

Product A: 10 wt % ethylene oxide/propylene oxide block copolymer (40 wt % EO/60 wt % PO, molecular weight 2,900); 15 wt % oleine; 75 wt % water, containing 4.8 wt % (based on total product mixture) of a 47% active sodium hydroxide solution. The pH of the product is greater than 9.0.

The oleine is a mixture of 67 wt % oleic acid, 9 wt % linoleic acid, 8% $C_{16}$ unsaturated acids and 13 wt % $C_{16}/C_{18}$ saturated fatty acids.

Product B: 100% oleine, as in Product A.

Product C: 10 wt % EO/PO block copolymer as in Product A; 90 wt % water

Product D: 10 wt % ethylene oxide/propylene oxide block copolymer as in Product A; 15 wt % oleine as in Product A; 5 wt % 2-ethylhexanol; 70 wt % water.

Products A and D are products of the invention and Products B and C are comparative products.

Product A was produced as follows:
(i) ethylene oxide/propylene oxide block copolymer mixed with deionised water and allowed to dissolve.
(ii) sodium hydroxide (alkali) added with stirring.
(iii) oleine added.
(iv) agitation continued until clear composition is obtained.

Product D was produced as follows:
(i) oleine mixed with deionised water.
(ii) ethylene oxide/propylene oxide block copolymer added to mixture.
(iii) 2-ethyl hexanol added to mixture.
(iv) vigorous mixing with a Heidolph stirrer maintained throughout additions (i) to (iii).

(v) composition mixed for a further two hours to ensure full homogenisation.

The tests for measuring crystal size and yield were carried out as follows.

Preparation of 7 Liters of Synthetic Liquor 1. 1946.0±0.2 g of deionised water were measured into a stainless steel beaker and placed in the fume cupboard. 1174.6±0.2 g sodium hydroxide pellets were added slowly with stirring until all the pellets had dissolved completely. To this 1673.0±0.2 g alumina trihydrate were added slowly with further stirring.
2. When all the materials had been added an immersion heater was switched on, the liquor was stirred and brought to the boil (>103° C.) for 1 hour.
3. After this period had elapsed, the solution was diluted to 4 litres using hot deionised water (>80° C.).
4. The solution was immediately filtered through a glass fibre filter paper (GF/C).
5. The filtrate produced was allowed to cool to 60° C. before being transferred to a pre-marked container, and made up to the mark with deionised water (room temperature).

Evaluation of Crystallisation Modifiers 1. 234.0±0.1 g synthetic liquor (produced as above) was weighed into pre-labelled, clean, 250 ml Nalgene bottles and sealed tightly.
2. The speed of the carousel (tumbler) was set at 10 rpm and the bottles were placed on for 45 minutes to allow equilibration of the synthetic liquor to 75° C.
3. The bottles were removed and, quickly, a known amount of crystallisation modifier was added to the liquor. The bottles were tightly resealed and placed back in the rotating water bath for 30 minutes.
4. The bottles were removed and pre-weighed, 10.00±0.002 g samples of seed ($Al_2O_3 \cdot 3H_2O$) were added and the bottles returned to the water bath and agitated for a further 300 minutes (at 75° C.).
5. The samples were removed and filtered immediately through pre-weighed Whatman GF/C filter papers and the retained solids were rinsed with 2 liters of hot water (>80° C.) to remove any residual caustic.
6. The "dry" filtered samples were placed into tallform beakers and dried overnight at 105° C., prior to analysis using the Coulter LS130 Particle Size Analyser.
7. The Particle Size Analyser measures the crystal size, given below in microns. The yield (number of grams of crystals obtained from the sample) can also be measured.

In these experiments Product A is compared with Blank 1, Product B is compared with Blank 2, Product C is compared with Blank 3 and Product D is compared with Blank 4. Each addition was tested three times and the percentages given are the mean results.

Table 1 shows the percentage of crystals formed which have size below 45 microns and below 75 microns. The "percent reduction" shows the percentage difference from the relevant comparative blank. A negative reduction demonstrates an average decrease in particle size.

Results are shown in Table 1 below.

TABLE 1

| Crystallisation Modifier | % of Crystals below 45 m | % Reduction | % of Crystals below 75 m | % Reduction |
|---|---|---|---|---|
| Blank 1 | 11.3 | — | 50.6 | — |
| 50 mg/l Product A | 8.9 | +21.2 | 44.8 | +11.5 |
| 100 mg/l Product A | 8.6 | +23.9 | 44.8 | +11.5 |

TABLE 1-continued

| Crystallisation Modifier | % of Crystals below 45 m | % Reduction | % of Crystals below 75 m | % Reduction |
|---|---|---|---|---|
| Blank 2 | 33.6 | — | 70.5 | — |
| 100 mg/l Product B | 57.9 | −72.3 | 83.3 | −18.2 |
| Blank 3 | 11.3 | — | 50.6 | — |
| 50 mg/l Product C | 11.6 | −2.7 | 50.5 | +0.2 |
| 100 mg/l Product C | 11.8 | −4.4 | 51.9 | −2.6 |
| 500 mg/l Product C | 12.4 | −9.7 | 52.3 | −3.4 |
| Blank 4 | 12.9 | — | 52.8 | — |
| 25 mg/l Product D | 10.7 | +17.1 | 45.9 | +13.1 |
| 75 mg/l Product D | 14.6 | −13.2 | 51.8 | +1.9 |
| 150 mg/l Product D | 11.1 | +14.0 | 45.8 | +13.3 |

Table 2 shows the results for further tests comprising Product A with a blank and measuring the yield obtained.

TABLE 2

| Dose | % of crystals below 45 microns | % of crystals below 75 microns | Yield/g |
|---|---|---|---|
| Blank | 11.7 | 51.0 | 25.4 |
| 10 mg/l | 8.5 | 46.6 | 24.9 |
| 50 mg/l | 8.7 | 43.9 | 26.3 |
| 100 mg/l | 9.1 | 45.6 | 24.9 |
| 200 mg/l | 10.1 | 46.6 | 25.2 |
| 500 mg/l | 12.3 | 50.9 | 25.2 |

The results in Table 1 show that Product A consistently gives a reduction in the percentage of crystals with size below 45 microns and with size below 75 microns. Products B and C generally tend to give an increase in the percentage of crystals with small particle size. Product D of the invention generally tends to reduce the percentage of very small crystals, of size below 45 microns and always reduces the percentage of crystals below 75 microns. Optimum dosage of this product appears to be 25 mg/l.

The results in Table 2 also confirm the finding that Product A shows a reduction in the percentage of crystals with size below 45 mm and with size below 75 mm. Optimum dosage for this system is 200 mg/l or below. Table 2 also demonstrates that the action of the crystallisation modifier does not lead to a reduction in the yield, which is maintained at the levels obtained with the blank test.

What is claimed is:

1. A process for recovering alumina from a pregnant Bayer process liquor by crystallisation after adding to the liquor a crystallisation modifier characterised in that the crystallisation modifier comprises:
   (a) a polyalkoxylated non-ionic surfactant,
   (b) a surfactant, or precursor thereof, that comprises a water soluble fatty acid or fatty acid salt and which is not a polyalkoxylated non-ionic surfactant and
   (c) water.

2. A process according to claim 1 in which the polyalkoxylated non-ionic surfactant contains units of ethylene oxide and propylene oxide.

3. A process according to claim 1 in which the polyalkoxylated non-ionic surfactant is an ethylene oxide-propylene oxide block copolymer.

4. A process according to claim 1 in which the polyalkoxylated non-ionic surfactant has a cloud point measured in 1% solution of from 10 to 70° C.

5. A process according to claim 1 in which the polyalkoxylated non-ionic surfactant has a molecular weight of at least 600 Daltons.

6. A process according to claim 1 in which the crystallisation modifier is a composition comprising 30 to 97 wt % water, 1 to 30 wt % polyalkoxylated non-ionic surfactant (a) and 2 to 40 wt % surfactant (b) or precursor thereof.

7. A process according to claim 1 in which the surfactant (b) comprises oleic acid.

8. A process according to claim 1 in which the crystallisation modifier has a pH of at least 8.0.

9. A process according to claim 1 in which the crystallisation modifier is substantially free of mineral oil and silicone oil.

10. A process according to claim 1 in which the polyalkoxylated non-ionic surfactant (a) or the surfactant (b) or both are water-soluble.

11. A process for recovering alumina from a pregnant Bayer process liquor by crystallisation after adding to the liquor a crystallisation modifier characterised in that the crystallisation modifier comprises:

(a) a polyalkoxylated non-ionic surfactant, (b) a surfactant, or precursor thereof, that comprises a water soluble fatty acid or fatty acid salt and which is not a polyalkoxylated non-ionic surfactant and the crystallisation modifier comprises not more than 15% by weight of the crystallisation modifier composition of silicone and mineral oil.

12. A process according to claim 11 in which the crystallisation modifier is substantially free of silicone oil and mineral oil.

13. A process according to claim 11 in which the crystallisation modifier comprises at least 30 wt % polyalkoxylated non-ionic surfactant.

14. A process according to claim 11 in which the crystallisation modifier consists essentially of polyalkoxylated non-ionic surfactant (a) and surfactant (b) or precursor thereof.

* * * * *